(12) United States Patent
Cramer

(10) Patent No.: US 9,919,692 B2
(45) Date of Patent: Mar. 20, 2018

(54) MOTOR VEHICLE ASSEMBLY ARRANGEMENT WITH AN INTERNAL COMBUSTION ENGINE AND A SWITCHABLE VACUUM PUMP

(71) Applicant: PIERBURG PUMP TECHNOLOGY GMBH, Neuss (DE)

(72) Inventor: Sebastian Cramer, Pulheim (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 15/105,575

(22) PCT Filed: Dec. 19, 2013

(86) PCT No.: PCT/EP2013/077429
§ 371 (c)(1),
(2) Date: Jun. 17, 2016

(87) PCT Pub. No.: WO2015/090415
PCT Pub. Date: Jun. 25, 2015

(65) Prior Publication Data
US 2017/0008501 A1    Jan. 12, 2017

(51) Int. Cl.
*B60T 17/02* (2006.01)
*F04C 25/02* (2006.01)
(Continued)

(52) U.S. Cl.
CPC .............. *B60T 17/02* (2013.01); *F04C 18/34* (2013.01); *F04C 25/02* (2013.01); *F04C 28/06* (2013.01);
(Continued)

(58) Field of Classification Search
CPC .. B60T 8/34; B60T 13/52; B60T 17/02; F04C 18/344; F04C 28/06; F04C 29/0071; F16D 41/088
(Continued)

(56) References Cited

U.S. PATENT DOCUMENTS 3,279,571 A    10/1966 Wassilieff
3,754,841 A *   8/1973 Grabb ..................... B60T 17/02
                                       417/189
(Continued)

FOREIGN PATENT DOCUMENTS

CN       102356239 A    2/2012
CN       102844570 A    12/2012
(Continued)

*Primary Examiner* — Robert A. Siconolfi
*Assistant Examiner* — San M Aung
(74) *Attorney, Agent, or Firm* — Norman B. Thot

(57) ABSTRACT

An arrangement of motor vehicle units includes a vacuum pump, a power brake unit, a pump which pumps a hydraulic fluid with a control pressure, and a control valve. The vacuum pump comprises a pump rotor, a coupling element, a control connection, a coupling arrangement switchable by the control connection to lock/unlock the coupling element with the pump rotor, and a suction connection. The power brake unit comprises a negative pressure chamber connected with the suction connection. The control valve, when unlocked, switches the control pressure of the hydraulic fluid through to the control connection to unlock. The control valve comprises an actuator acted on by a pressure of the negative pressure chamber which switches the control pressure through to the control connection if the pressure in the negative pressure chamber is greater than a threshold pressure so that the switchable control valve is switched into its unlocked state.

31 Claims, 4 Drawing Sheets

(51) Int. Cl.
  *F04C 29/00*    (2006.01)
  *F04C 18/34*    (2006.01)
  *F04C 28/06*    (2006.01)
  *F04C 18/344*   (2006.01)

(52) U.S. Cl.
  CPC ........ *F04C 29/005* (2013.01); *F04C 29/0071* (2013.01); *F04C 29/0085* (2013.01); *F04C 18/3441* (2013.01)

(58) Field of Classification Search
  USPC .......................................................... 303/12
  See application file for complete search history.

(56) References Cited

U.S. PATENT DOCUMENTS

| | | | |
|---|---|---|---|
| 4,208,872 A * | 6/1980 | Shimizu | B60T 13/245 60/280 |
| 4,883,444 A | 11/1989 | Strickler et al. | |
| 2001/0011456 A1 * | 8/2001 | Hagen | B60T 13/46 60/397 |
| 2012/0034107 A1 | 2/2012 | Crotti et al. | |
| 2013/0039790 A1 | 2/2013 | Cuneo et al. | |
| 2015/0316059 A1 | 11/2015 | Warner et al. | |

FOREIGN PATENT DOCUMENTS

| | | |
|---|---|---|
| CN | 104937272 A | 9/2015 |
| DE | 38 16 435 A1 | 12/1988 |
| DE | 198 54 243 A1 | 5/2000 |
| EP | 2 746 584 A1 | 6/2014 |
| JP | 39-35082 A | 11/1964 |
| JP | 49-1130509 A | 10/1974 |
| WO | WO 2010/106505 A2 | 9/2010 |
| WO | WO 2012/164466 A1 | 12/2012 |

\* cited by examiner

MOTOR VEHICLE ASSEMBLY ARRANGEMENT WITH AN INTERNAL COMBUSTION ENGINE AND A SWITCHABLE VACUUM PUMP

CROSS REFERENCE TO PRIOR APPLICATIONS

This application is a U.S. National Phase application under 35 U.S.C. § 371 of International Application No. PCT/EP2013/077429, filed on Dec. 19, 2013. The International Application was published in German on Jun. 25, 2015 as WO 2015/090415 A1 under PCT Article 21(2).

FIELD

The present invention relates to an arrangement of motor vehicle units consisting of an internal combustion engine, a vacuum pump that is mechanically coupled with and driven by the internal combustion engine, and a pneumatic power brake unit that is evacuated, i.e., supplied with negative pressure, by the vacuum pump.

BACKGROUND

In motor vehicles, the vacuum pump produces a negative absolute pressure of, for example, less than 500 millibars and makes it available in the form of potential energy for the pneumatic power brake unit. The mechanical vacuum pump is mechanically coupled, through a coupling element, with the internal combustion engine, and is thereby mechanically driven. Operation of the vacuum pump to supply the power brake unit is relatively rarely required, for example, at the beginning of operation of the motor vehicle and after each braking procedure. To minimize the wear and energy consumption of the drive of the vacuum pump, the vacuum pump is equipped with a coupling arrangement through which the coupling element, which is mechanically driven by the combustion engine, and the pump rotor, which is embodied as a compressor, can be intentionally locked to one another in a non-rotatable manner or unlocked from one another.

DE 198 54 243 C2 describes an arrangement of motor vehicle units in which a pneumatic friction clutch couples the pump rotor with the coupling element when required. Relatively high forces are required to open or close a friction clutch. Since the friction clutch has a pneumatic actuator, another pressure source must be available for this purpose in order to always be able to switch, which makes the construction relatively complex.

SUMMARY

An aspect of the present invention is to provide a simple and reliable arrangement of motor vehicle units with a switchable mechanical vacuum pump.

In an embodiment, the present invention provides an arrangement of motor vehicle units which includes a vacuum pump, a pneumatic power brake unit, a hydraulic pump, and a switchable control valve. The vacuum pump comprises a positive-displacement pump rotor, a coupling element configured to be mechanically driven by an internal combustion engine, a hydraulic control connection, a coupling arrangement configured to be hydraulically switchable by the hydraulic control connection to lock the coupling element with the positive-displacement pump rotor in a non-rotatable manner in a locked state and to unlock the coupling element from the positive-displacement pump rotor in an unlocked state, and a suction connection. The pneumatic power brake unit comprises a negative pressure chamber which is connected, via a vacuum line, with the suction connection of the vacuum pump. The hydraulic pump is configured to pump a hydraulic fluid with a control pressure. The switchable control valve is configured, in its unlocked state, to switch the control pressure of the hydraulic fluid through to the hydraulic control connection so as to unlock. The switchable control valve comprises a pneumatic actuator configured to be acted on by a pressure of the negative pressure chamber and to switch the control pressure through to the hydraulic control connection if the pressure in the negative pressure chamber is greater than a threshold pressure so that the switchable control valve is switched into its unlocked state.

BRIEF DESCRIPTION OF THE DRAWINGS

The present invention is described in greater detail below on the basis of embodiments and of the drawings in which.

DETAILED DESCRIPTION

Figure 1:
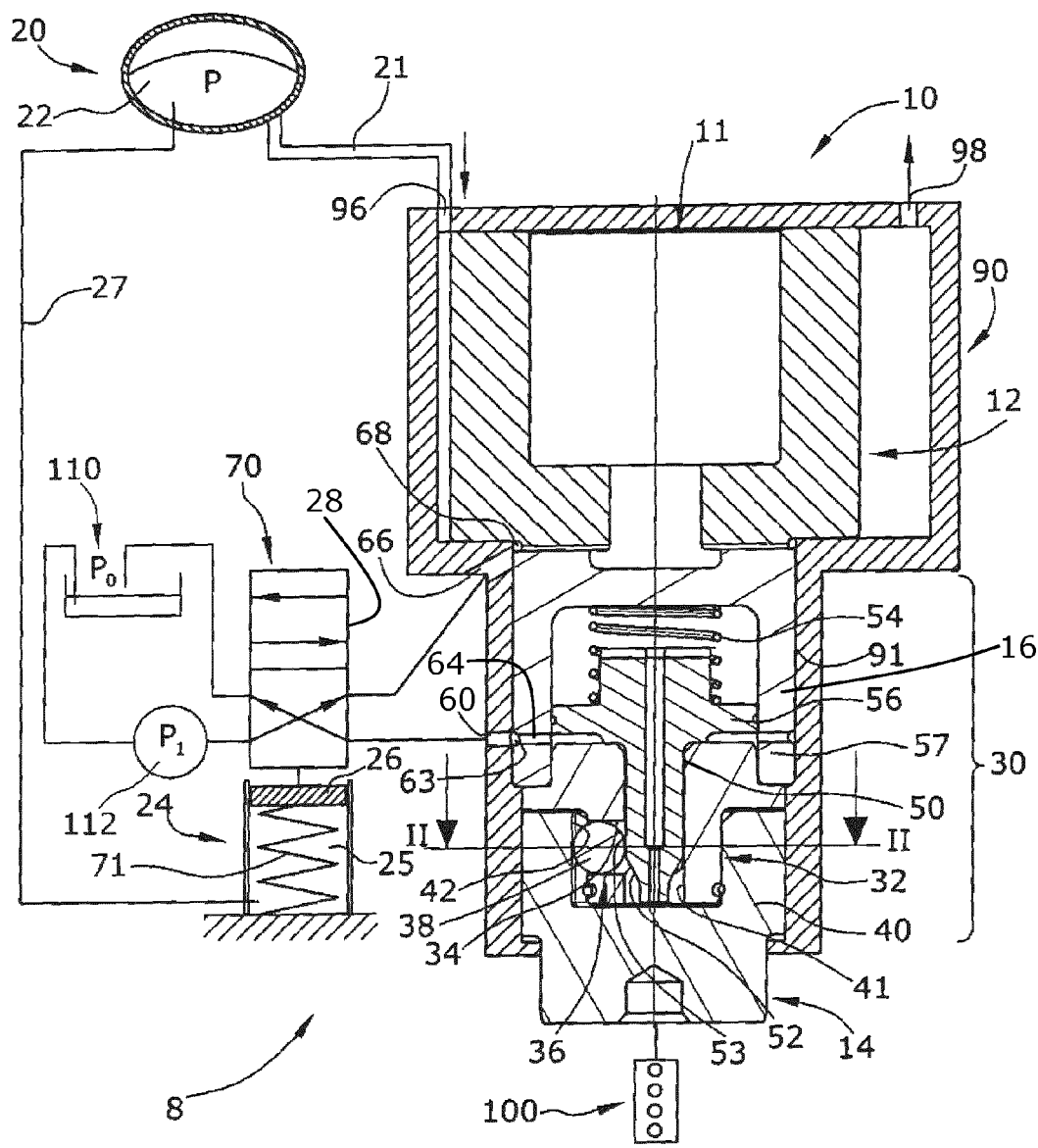
FIG. 1 shows an arrangement of motor vehicle units with a pneumatic power brake unit, a hydraulic pump, and a longitudinal section of a mechanical motor vehicle vacuum pump in the locked state, which is driven by an internal combustion engine.

The arrangement of units is composed of a plurality of units, namely essentially the motor vehicle internal combustion engine, the switchable mechanical vacuum pump, which is mechanically driven by the internal combustion engine, and the pneumatic power brake unit.

The power brake unit has a negative pressure chamber that is connected, through a vacuum line, with a suction connection of the vacuum pump. During operation of the internal combustion engine, the pressure P in the negative pressure chamber is kept below a threshold pressure PS, for example, below an absolute pressure of 600-500 millibars. As soon as the pressure P in the negative pressure chamber of the power brake unit rises above the threshold pressure PS, the vacuum pump again reduces the pressure P in the negative pressure chamber through the suction connection.

The vacuum pump has a coupling element that is permanently and non-rotatably coupled with the internal combustion engine, for example, with its crankshaft or camshaft. The coupling element therefore always rotates with a rotational speed that is proportional to that of the internal combustion engine. The vacuum pump has a positive-displacement pump rotor that can be coupled with the coupling element through a hydraulically switchable coupling arrangement. The pump rotor pumps the gas out of the negative pressure chamber, from the vacuum pump's suction connection to its pressure connection, and compresses it in the process.

The vacuum pump has a hydraulic control connection that is fluidically connected with the coupling arrangement so that the hydraulic coupling arrangement can be controlled by an appropriate hydraulic pressure on the control connection. This is done to lock the coupling element in a non-rotatable manner with the pump rotor when the coupling arrangement is in its locked state, and to unlock the coupling element from the pump rotor when the coupling arrangement is in its unlocked state.

A hydraulic pump is provided to pump a hydraulic fluid with a control pressure P1. The hydraulic pump can, for example, be a lubricant pump to supply the internal combustion engine with the hydraulic fluid in the form of a lubricant. In principle, however, the hydraulic pump can also be a pure hydraulic pump that also hydraulically supplies other hydraulic accessories in the motor vehicle.

Fluidically, a switchable control valve is provided between the hydraulic pump and the vacuum pump, that, in its open, unlocked state switches the control pressure P1 of the hydraulic fluid through to the vacuum pump's control connection to unlock the coupling arrangement. As soon as the control pressure P1 of the hydraulic fluid is switched through by the control valve, which is open in its unlocked state, to the vacuum pump's control connection, the coupling arrangement is switched into its unlocked state. If the hydraulic pump fails, or if there is a malfunction in the control valve, no control pressure is applied to the control connection, so that in this case, the vacuum pump coupling arrangement is always operated in the locked state. This provides the entire control system of the arrangement of units a fail-safe design.

The control valve is associated with a pneumatic actuator which is switched, i.e., actuated, with the pressure P in the negative pressure chamber of the pneumatic power brake unit. If the pressure P is greater than the threshold pressure PS, the control valve opens into its unlocked state so that the hydraulic control pressure P1 is switched through to the control connection. This switches the coupling arrangement into its unlocked state.

Hydraulics are used to directly switch the coupling of the vacuum pump. An internal combustion engine always has a hydraulic pump, in the form of a lubricant pump, associated with it. The hydraulic pressure generated by the hydraulic pump is therefore available without additional complexity. The hydraulic pressure generated by the hydraulic pump can be up to several bar so that large forces are also available to switch the coupling arrangement. This is helpful, for example, when the coupling arrangement is in the form of a friction clutch, and is prestressed with a high prestressing force in its locked position, that is, in its engaged state. The control pressure P1 for switching the coupling arrangement need not necessarily be identical with the hydraulic pressure that is generated by the hydraulic pump, but can rather be lower than the hydraulic pressure of the hydraulic pump.

In an embodiment of the present invention, the control valve can, for example, have a prestress element that prestresses the control valve into its locked state. If the actuator system for the control valve fails, it is standard practice for the latter to be prestressed into its locked state, i.e., its closed state. This provides that if the control valve actuator system fails, the coupling arrangement always remains in, or is switched into, its locked state, so that the pump rotor of the vacuum pump is still driven.

In an embodiment of the present invention, when the control valve is in its locked state, it can, for example, switch atmospheric hydraulic pressure P0 through to the control connection. This in particular provides that when the control valve is changed over into its locked state, i.e., when the control valve is closed, the hydraulic pressure in the coupling arrangement of the vacuum pump quickly drops to atmospheric pressure so that the coupling arrangement is quickly switched into its locked state and the vacuum pump begins its pump operation.

In an embodiment of the present invention, the switchable coupling arrangement can, for example, be a form-fit coupling arrangement to lock the coupling element with the pump rotor in a non-rotatable manner in the locked state and to unlock the coupling element from the pump rotor in the unlocked state. The form-fit coupling arrangement is locked together in a form-fit manner so that very high torques can be transferred with very high reliability. The coupling arrangement cannot slip through in the locked state. Since the force is transferred in a form-fit manner in the locked state, no high actuating forces are in principle required to close and open the coupling. This circumstance allows the coupling arrangement to have a very compact structure.

In an embodiment of the present invention, the pump housing can, for example, have a separate lubrication connection that is arranged axially between the control connection and the pump rotor. The pump bearing is lubricated through the lubrication connection, especially if it is in the form of a plain bearing. The pump bearing can, for example, be arranged axially between the pump rotor and the coupling arrangement. The pump system can also be supplied with lubricant through the lubrication connection.

In an embodiment of the present invention, the lubrication connection can, for example, also be hydraulically connected with the control valve which, in its unlocked state, switches atmospheric pressure P0 through to the lubrication connection. This creates a circuit for the hydraulic fluid so that leakage of the hydraulic fluid is intentionally and completely removed and the pump system can be prevented from filling up with hydraulic fluid. If the pump bearing is arranged axially between the lubrication connection and the control connection, or between the pump rotor and the coupling arrangement, it constantly has hydraulic fluid flowing through it in the axial direction due to the pressure differential between the lubrication connection and the control connection.

In an embodiment of the present invention, the coupling can, for example, have a bar holder that is non-rotatably connected with the pump rotor or the coupling element and that has at least one radial bar guide and a bar body that can be moved in the bar guide. It is not necessary for the bar guide to have an exactly radial orientation. It must, however, have a radial component so that the bar body can move with a radial component, however, not necessarily exactly in the radial direction, between a radially inner and a radially outer position in the bar guide. The bar guide need not necessarily be completely closed transverse to the direction of motion of the bar body, but can rather also be open like a channel. The bar body can, for example, be pin-shaped or in the form of a sphere.

In an embodiment of the present invention, the bar holder can, for example, be associated with a guide body which can be moved in the axial direction and which has a guide surface that is inclined in the axial direction. The guide surface that is inclined in the axial direction moves or forces the bar body in the radial direction into a locked position. The guide surface is the surface that radially pushes or forces the bar body into a locked position when the guide body is moved into the locked position. The axial inclination of the guide surface determines the mechanical lever between the axial movement of the guide body and the radial movement of the bar body.

In an embodiment of the present invention, the coupling arrangement can, for example, have a trap body that is non-rotatably connected with the coupling element or the pump rotor and that has at least one rotary trap depression into which the bar body radially engages in its locked position. The trap body is mounted so that it can rotate around the pump's axial line, approximately in the transverse plane of the bar holder, and is coaxial therewith. The trap depression is arranged approximately in the plane or transverse plane of the bar guide. In the area of the trap depression, the radius of the bottom of the trap depression is selected so that the bar body partly projects into the trap depression and partly remains in the bar guide of the bar holder. This produces a form-fit connection of the bar holder with the trap body. Outside the trap depression, the radius of the trap body approximately corresponds, for example, to the radius of the bordering bar holder.

In an embodiment of the present invention, the bar holder can, for example, be non-rotatably connected with the pump rotor and the trap body can, for example, be non-rotatably connected with the coupling element. The bar holder can, for example, be arranged radially within the trap body. As long as the bar holder rotates, centrifugal force moves the bar body radially outward against the trap body and possibly into the trap depression. In the unlocked state, the pump rotor stops together with the bar holder so that the bar body is held within the bar guide of the bar holder by the still rotating trap body. Only once the guide body is moved out of the unlocked state into the locked state does the inclined guide surface press the bar body radially outward, so that the bar body finally engages into the trap depression of the trap body and the bar holder together with the pump rotor is carried along with the rotating trap body.

In an embodiment of the present invention, multiple bar guides with multiple bar bodies can, for example, be provided in the bar holder, a corresponding number of trap depressions also being provided on the trap body. This improves the torque that can be transferred and the redundancy or the failure safety.

In an embodiment of the present invention, the guide body can, for example, have a cylindrical blocking surface on it that blocks the bar body in the locked position of the bar body. The blocking surface can, for example, directly border the guide surface in the axial direction. This means that in the locked position, only very small retention forces must be applied to hold the bar body in its locked position.

In an embodiment of the present invention, the guide body can, for example, be mechanically prestressed into the locked position by a prestress element. If the actuator system to move the guide body fails, the guide body is always moved into the locked position by the prestress element so that the coupling arrangement remains in, or is put into, its locked state. This makes the coupling arrangement fail-safe.

In an embodiment of the present invention, the guide body can, for example, have a hydraulic piston which is arranged so that it can be axially moved in a hydraulic cylinder that is non-rotatably associated with the bar holder. That is, the hydraulic actuator system is completely associated with the bar holder.

In an embodiment of the present invention, the vacuum pump can, for example, have a pump housing that in particular surrounds the pump rotor and has the pivot bearing of the entire rotor. The pump housing has the hydraulic control connection that is hydraulically connected with the hydraulic cylinder.

In an embodiment of the present invention, the control connection can, for example, be connected with a ring channel between the pump housing and a cylindrical body that radially borders the hydraulic cylinder. The closed ring channel allows the hydraulic fluid, for example, a lubricant, to flow from the stationary housing into the rotating hydraulic cylinder, or conversely, from the hydraulic cylinder back to the stationary housing or to the hydraulic control connection.

An embodiment of the present invention is explained in detail below under reference to the drawings.

Figure 3:
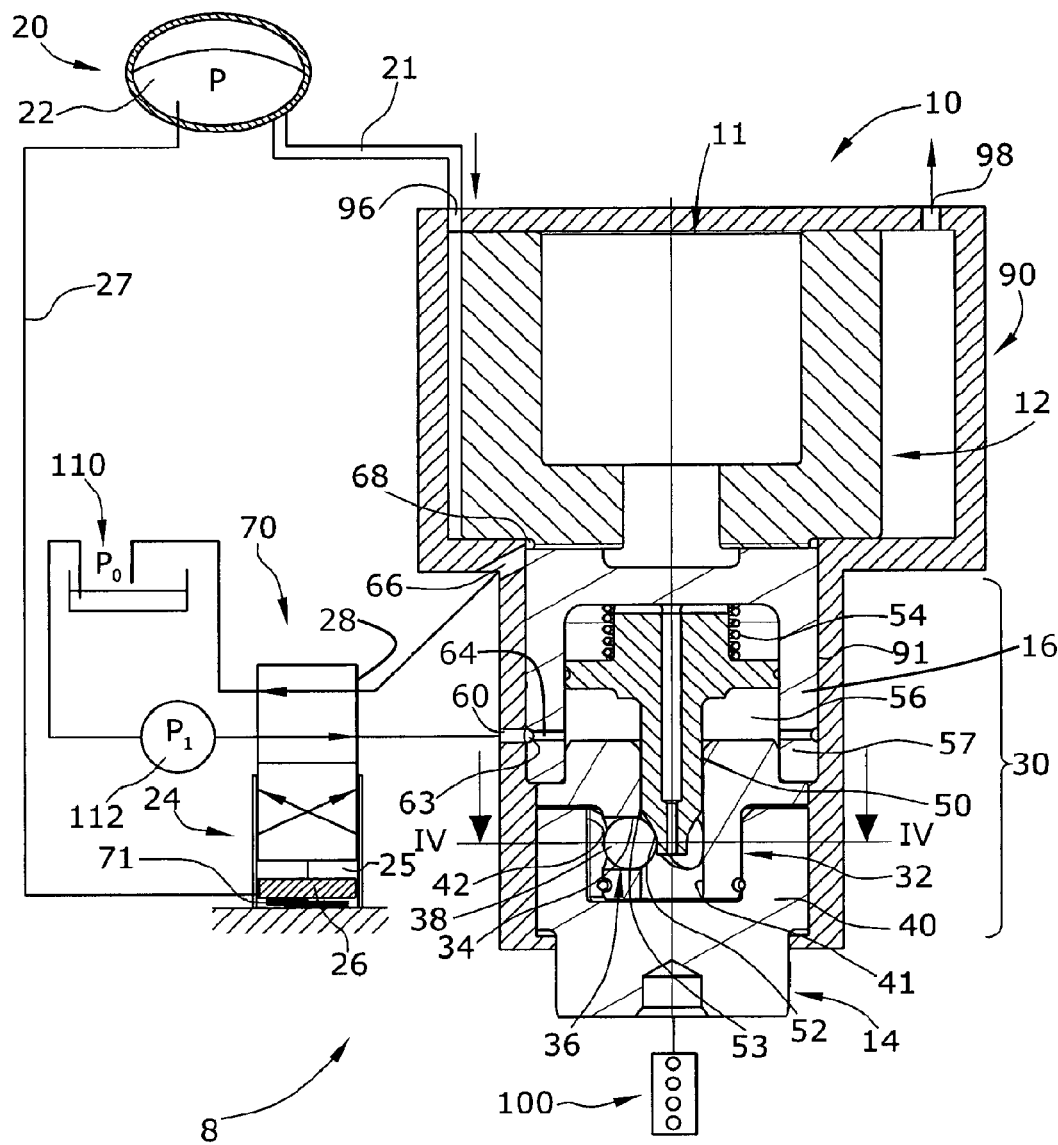
FIG. 3 shows the arrangement of motor vehicle units from FIG. 1 with the motor vehicle vacuum pump in the unlocked state; and, FIG. 4 shows a cross section IV-IV in the area of the coupling arrangement of the motor vehicle vacuum pump shown in FIG. 3.

FIGS. 1 and 3 show an arrangement of motor vehicle units 8 that is essentially formed by an internal combustion engine 100, a hydraulically switchable mechanical vacuum pump 10 including a control valve 70, and a pneumatic power brake unit 20.

The motor vehicle vacuum pump 10 is mechanically coupled to the crankshaft or the camshaft of the internal combustion engine 100. The motor vehicle vacuum pump 10 produces a negative pressure of less than 500 millibars for the pneumatic power brake unit 20. The pneumatic power brake unit 20 has a negative pressure chamber 22 that has an instantaneous pressure P. The negative pressure chamber 22 is evacuated, possibly through a vacuum line 21, which is pneumatically connected with a suction connection 96 of the motor vehicle vacuum pump 10.

A hydraulic pump 112, which is a lubricant pump in the shown embodiment, suctions the hydraulic fluid, which in this case is the lubricant, out of a lubricant tank 110, which has an atmospheric pressure P0, and pumps the lubricant with a working pressure P1, for example, to the internal combustion engine 100.

The motor vehicle vacuum pump 10 is in the form of a positive-displacement pump and has a rotor 11 that is composed of multiple parts. The rotor 11 has a pump rotor 12 that is, for example, in the form of a rotary vane pump rotor 12. Axially connected to the pump rotor 12, the rotor 11 also has a cup-shaped cylindrical body 16 in whose interior a guide body 50 is mounted so that it can be displaced in the axial direction. The cylindrical outside of the cylindrical body 16 and the cylindrical inside of the relevant section of the pump housing 90 form a radial rotor bearing 91, which in this case is in the form of a plain bearing.

The cylindrical body 16 is axially connected to a bar holder 32 that axially seals, in a pressure-tight manner, the cylindrical interior surrounding the cylindrical body 16. The pump rotor 12, the cylindrical body 16, and the bar holder 32 are non-rotatably connected together, for example, they are screwed, soldered, or welded together, and together with the guide body 50, they form the rotor 11.

The rotor 11 is coaxially connected to a coupling element 14 that is mechanically coupled with the internal combustion engine 100. When the coupling arrangement 30 is in the unlocked state, the coupling element 14 is freely rotatable in relation to the rotor 11. For example, the coupling element 14 is rotatably supported in the pump housing 90 by a plain bearing.

The pump housing 90 has on its face a suction connection 96 that is connected to the working chamber of the pneumatic power brake unit 20. The pump housing 90 also has on its face a pressure connection 98 through which the compressed gas is expelled.

Figure 2:
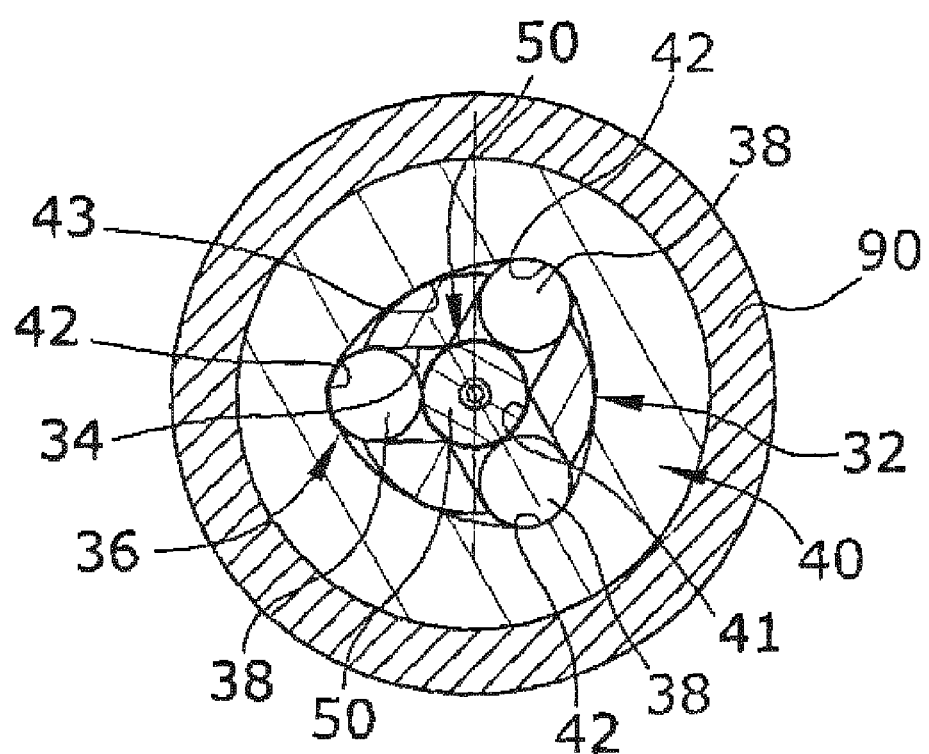
FIG. 2 shows a cross section II-II in the area of the coupling arrangement of the motor vehicle vacuum pump shown in FIG. 1.
Figure 4:
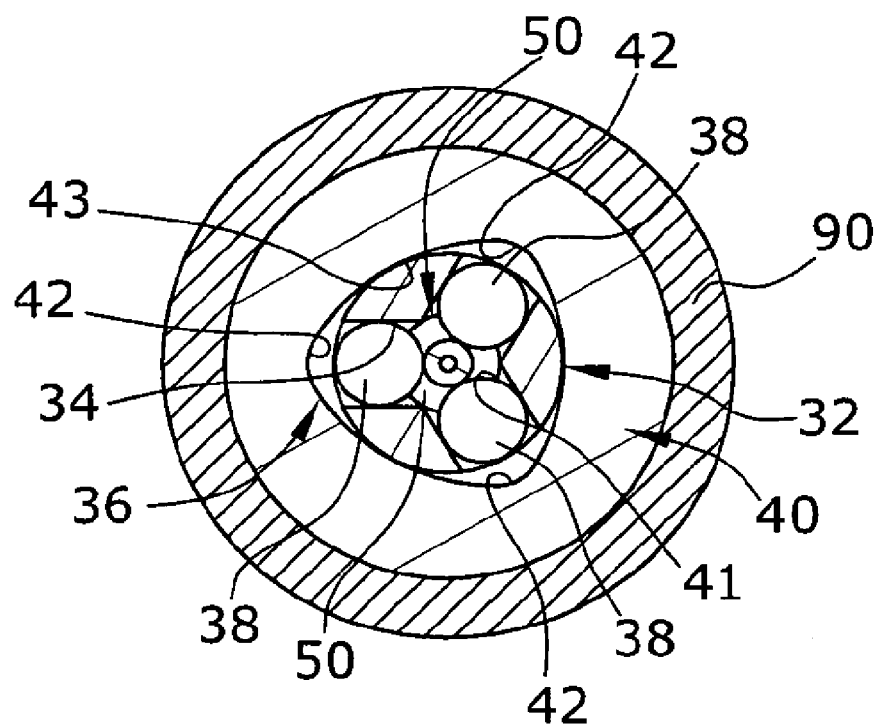

As is shown in FIGS. 2 and 4, the bar holder 32 has three radially oriented bar guides 34, which in this case are in the form of radial holes lying in a transverse plane and which are arranged at an angle of 120° to one another. Each of the bar guides 34 has a bar body 36 arranged in it, each of which is in the form of a sphere 38. A small clearance is provided between the bar body 36 and the bar guide 34 so that the bar body 36 can move radially without resistance in the bar guide 34.

The bar holder 32, whose outside is cylindrically shaped, is surrounded by a trap body 40 whose inside has the shape of a three-sided inside trochoid 43, as can be seen in FIGS. 2 and 4. Each trochoid point forms a trap depression 42 in which a bar body sphere 38 radially engages if the coupling arrangement 30 is in the locked state shown in FIGS. 1 and 2. The inside diameter of the trochoid 43 is slightly larger than the cylindrical outside diameter of the bar holder 32 so that, in the unlocked state shown in FIGS. 3 and 4, the trap body 40 or the coupling element 14 can rotate freely with respect to the bar holder 32.

The bar holder 32 has an axial guide hole 41 into which the bar guides 34 open. The partly cylindrical guide body 50 is mounted so that it can be axially moved in the guide hole 41. A cylindrical blocking surface 53 that is distally connected to a tapering conical guide surface 52 is provided at the distal free longitudinal end of the guide body 50. In the locked position of the guide body 50 shown in FIGS. 1 and 2, the cylindrical blocking surface 53 is aligned with the center transverse plane of the bar guides 34 so that the bar body spheres 38 are pushed radially outward and fixed, and each projects into a trap depression 42. In the locked state, a form-fit is produced between the bar holder 32 and the trap body 40 so that the rotor 11, including the pump rotor 12, is non-rotatably coupled with the coupling element 14.

In the unlocked state shown in FIGS. 3 and 4, the guide body 50 axially stands in its unlocked position so that the distal end of the tapering conical guide surface 52 is aligned with the center transverse plane of the bar guides 34. This allows the bar body spheres 38 to be completely inserted in the radial direction into the bar guides 34 so that the bar body spheres 38 no longer necessarily project into the trap depressions 42. The relative rotary movement between the trap body 40 and the bar holder 32 pushes the bar body spheres 38 radially inward into the bar guides 34 so that the trap body 40 can freely rotate with respect to the bar holder 32. In the unlocked state, the rotor 11, including the pump rotor 12, finally comes to a standstill, even if the coupling element 14 continues to rotate.

The guide body 50 is associated with and forms a single piece with a piston 56 that can be axially moved in a hydraulic cylinder 57. The piston 56 or the guide body 50 is mechanically prestressed in the axial direction into the locked position shown in FIGS. 1 and 2 by a prestress element 54 in the form of a helical spring. The hydraulic cylinder 57 is hydraulically fed by a radial hydraulic line 64 in the cylindrical body 16, the radial hydraulic line 64 opening into a ring channel 63 on the outer periphery of the cylindrical body 16. The ring channel 63 is fluidically connected with a hydraulic control connection 60 on the pump housing 90.

Another ring channel 68 is arranged in the transverse plane through the border between the pump rotor 12 and the cylindrical body 16 there, the ring channel 68 being fluidically connected with a lubrication connection 66 on the pump housing 90. The control connection 60 and the lubrication connection 66 are connected through corresponding hydraulic lines with the control valve 70, which is in the form of a 4/2 change-over valve with a corresponding valve body 27. The control valve 70 is mechanically switched by the pneumatic actuator 24.

The control valve 70 can alternately connect the working pressure P1 generated by the lubricant pump 112 or the atmospheric pressure P0 in the lubricant tank 110 to the control connection 60 and the lubrication connection 66. The control valve 70 is prestressed into its locked position shown in FIG. 1 by a prestress element 71 so that, if pneumatic actuator 24 is faulty, the hydraulic cylinder 57 is always connected to the atmospheric pressure P0.

The pneumatic actuator 24 is formed by a pneumatic piston 26 in a cylindrical space 25, the pneumatic piston 26 being acted upon by the pressure P from the power brake unit's negative pressure chamber 22 through a pneumatic line 27. The pneumatic piston 26 is securely connected with the valve body 28 of the control valve 70 so that the valve body 28 directly follows the movement of the pneumatic piston 26. The valve body 28 and the pneumatic piston 26 are mechanically prestressed in the locked state by a prestress element 71.

In the locked state shown in FIGS. 1 and 2, the pressure P in the negative pressure chamber 22 is below a threshold pressure PS so that the control valve 70 is in the locked position shown in FIG. 1. This causes the lubricant at the working pressure P1 to act on the lubrication connection 66, and atmospheric pressure P0 to act on the control connection, so that the hydraulic piston 56 is switched in a pressureless manner with atmospheric pressure P0. The coupling arrangement 30 is locked so that the pump rotor 12 rotates, which in turn evacuates the negative pressure chamber 22, thereby reducing the absolute pressure P in the negative pressure chamber 22 of the pneumatic power brake unit 20. The main flow of the lubricant runs in the axial direction from the lubrication connection 66 through the rotor bearing 91 to the control connection 60 so that the pump rotor 12 and the rotor bearing 91 is lubricated.

In the unlocked state shown in FIGS. 3 and 4, the pressure P in the negative pressure chamber 22 lies above the threshold pressure PS so that the control valve 70 is in, or is moved into, the unlocked position shown in FIG. 3. This causes the lubricant at working pressure P1 to be fed through the control connection 60 into the hydraulic cylinder 57 so that the guide body 50 is pushed into its unlocked position, which in turn finally rotationally uncouples the coupling element 14 from the rotor 11. The pump rotor 12 is uncoupled and comes to a standstill independently of the rotation of the coupling element 14 so that the negative pressure chamber 22 of the pneumatic power brake unit 20 is not any more evacuated.

The present invention is not limited to embodiments described herein; reference should be had to the appended claims.

What is claimed is:
1. An arrangement of motor vehicle units comprising:
   a vacuum pump comprising:
      a positive-displacement pump rotor,
      a coupling element configured to be mechanically driven by an internal combustion engine,
      a hydraulic control connection,
      a coupling arrangement configured to be hydraulically switchable by the hydraulic control connection to lock the coupling element with the positive-displacement pump rotor in a non-rotatable manner in a locked state, and to unlock the coupling element from the positive-displacement pump rotor in an unlocked state, and
      a suction connection;
   a pneumatic power brake unit comprising a negative pressure chamber which is connected, via a vacuum line, with the suction connection of the vacuum pump;
   a hydraulic pump configured to pump a hydraulic fluid with a control pressure;

a switchable control valve which is configured, in its unlocked state, to switch the control pressure of the hydraulic fluid through to the hydraulic control connection so as to unlock, the switchable control valve comprising:
  a pneumatic actuator configured to be acted on by a pressure of the negative pressure chamber and to switch the control pressure through to the hydraulic control connection if the pressure in the negative pressure chamber is greater than a threshold pressure so that the switchable control valve is switched into its unlocked state; and
  a pump housing comprising a separate lubrication connection arranged axially between the hydraulic control connection and the positive-displacement pump rotor,
wherein,
the switchable control valve is hydraulically connected with the separate lubrication connection, and
the switchable control valve, in its unlocked state, switches atmospheric pressure P0 through to the separate lubrication connection.

2. The arrangement as recited in claim 1, wherein the hydraulic pump is a lubricant pump configured to supply the internal combustion engine with the hydraulic fluid as a lubricant.

3. The arrangement as recited in claim 1, further comprising a prestress element configured to prestress the switchable control valve in its locked state.

4. The arrangement as recited in claim 1, wherein the switchable control valve, in its locked state, is further configured to switch atmospheric pressure through to the hydraulic control connection.

5. The arrangement as recited in claim 1, wherein the coupling arrangement is provided as a form-fit coupling comprising:
  a bar holder configured to be non-rotatably connected with the positive-displacement pump rotor or with the coupling element, the bar holder comprising at least one radial bar guide and a bar body which is configured to be displaceable in the at least one radial bar guide;
  a guide body configured to be displaceable in an axial direction, the guide body being associated with the bar holder and comprising a guide surface which is inclined in the axial direction, the guide surface being configured to force the bar body in a radial direction into a locked position; and
  a trap body configured to be non-rotatably connected with the coupling element or with the positive-displacement pump rotor, the trap body comprising at least one rotary trap depression which is configured to have the bar body engage therewith in a locked position of the bar body.

6. The arrangement as recited in claim 5, further comprising a cylindrical blocking surface arranged on the guide body, the cylindrical blocking surface being configured to block the bar body in the locked position of the bar body.

7. The arrangement as recited in claim 6, wherein the cylindrical blocking surface is further arranged to axially border the guide surface.

8. The arrangement as recited in claim 5, further comprising a prestress element configured to mechanically prestress the guide body into the locked position.

9. The arrangement as recited in claim 5, wherein the at least one rotary trap depression is arranged radially outside the at least one radial bar guide.

10. The arrangement as recited in claim 5, wherein the bar body is a sphere.

11. The arrangement as recited in claim 5, further comprising:
  a hydraulic cylinder non-rotatably associated with the bar holder,
  wherein, the guide body further comprises a hydraulic piston which is arranged to be axially displaceable in the hydraulic cylinder.

12. The arrangement as recited in claim 11, further comprising:
  a pump housing which comprises the hydraulic control connection,
  wherein, the hydraulic connection is hydraulically connected with the hydraulic cylinder.

13. The arrangement as recited in claim 12, further comprising:
  a cylindrical body configured to radially border the hydraulic cylinder; and
  a ring channel arranged between the pump housing and the cylindrical body,
  wherein, the control connection is connected with the ring channel.

14. An arrangement of motor vehicle units comprising:
  a vacuum pump comprising:
    a positive-displacement pump rotor,
    a coupling element configured to be mechanically driven by an internal combustion engine,
    a hydraulic control connection,
    a coupling arrangement configured to be hydraulically switchable by the hydraulic control connection to lock the coupling element with the positive-displacement pump rotor in a non-rotatable manner in a locked state, and to unlock the coupling element from the positive-displacement pump rotor in an unlocked state, and
    a suction connection;
  a pneumatic power brake unit comprising a negative pressure chamber which is connected, via a vacuum line, with the suction connection of the vacuum pump;
  a hydraulic pump configured to pump a hydraulic fluid with a control pressure; and
  a switchable control valve which is configured, in its unlocked state, to switch the control pressure of the hydraulic fluid through to the hydraulic control connection so as to unlock, the switchable control valve comprising:
    a pneumatic actuator configured to be acted on by a pressure of the negative pressure chamber and to switch the control pressure through to the hydraulic control connection if the pressure in the negative pressure chamber is greater than a threshold pressure so that the switchable control valve is switched into its unlocked state,
  wherein,
  the coupling arrangement is provided as a form-fit coupling comprising:
    a bar holder configured to be non-rotatably connected with the positive-displacement pump rotor or with the coupling element, the bar holder comprising at least one radial bar guide and a bar body which is configured to be displaceable in the at least one radial bar guide;
    a guide body configured to be displaceable in an axial direction, the guide body being associated with the bar holder and comprising a guide surface which is inclined in the axial direction, the guide surface being configured to force the bar body in a radial direction into a locked position; and a trap body configured to be non-rotatably connected with the coupling element or with the positive-displacement pump rotor, the trap body comprising at least one rotary trap depression which is configured to have the bar body engage therewith in a locked position of the bar body.

15. The arrangement as recited in claim 14, wherein the hydraulic pump is a lubricant pump configured to supply the internal combustion engine with the hydraulic fluid as a lubricant.

16. The arrangement as recited in claim 14, further comprising a prestress element configured to prestress the switchable control valve in its locked state.

17. The arrangement as recited in claim 14, wherein the switchable control valve, in its locked state, is further configured to switch atmospheric pressure through to the hydraulic control connection.

18. The arrangement as recited in claim 14, further comprising:
a pump housing comprising a separate lubrication connection arranged axially between the hydraulic control connection and the positive-displacement pump rotor, wherein,
the switchable control valve is hydraulically connected with the separate lubrication connection, and
the switchable control valve, in its unlocked state, switches atmospheric pressure P0 through to the separate lubrication connection.

19. The arrangement as recited in claim 14, further comprising a cylindrical blocking surface arranged on the guide body, the cylindrical blocking surface being configured to block the bar body in the locked position of the bar body.

20. The arrangement as recited in claim 14, further comprising a prestress element configured to mechanically prestress the guide body into the locked position.

21. The arrangement as recited in claim 14, further comprising:
a hydraulic cylinder non-rotatably associated with the bar holder,
wherein, the guide body further comprises a hydraulic piston which is arranged to be axially displaceable in the hydraulic cylinder.

22. The arrangement as recited in claim 21, further comprising:
a pump housing which comprises the hydraulic control connection,
wherein, the hydraulic connection is hydraulically connected with the hydraulic cylinder.

23. An arrangement of motor vehicle units comprising:
a vacuum pump comprising:
a positive-displacement pump rotor,
a coupling element configured to be mechanically driven by an internal combustion engine,
a hydraulic control connection,
a coupling arrangement configured to be hydraulically switchable by the hydraulic control connection to lock the coupling element with the positive-displacement pump rotor in a non-rotatable manner in a locked state, and to unlock the coupling element from the positive-displacement pump rotor in an unlocked state, and
a suction connection;
a pneumatic power brake unit comprising a negative pressure chamber which is connected, via a vacuum line, with the suction connection of the vacuum pump;
a hydraulic pump configured to pump a hydraulic fluid with a control pressure;
a switchable control valve which is configured, in its unlocked state, to switch the control pressure of the hydraulic fluid through to the hydraulic control connection so as to unlock, the switchable control valve comprising:
a pneumatic actuator configured to be acted on by a pressure of the negative pressure chamber and to switch the control pressure through to the hydraulic control connection if the pressure in the negative pressure chamber is greater than a threshold pressure so that the switchable control valve is switched into its unlocked state; and
a prestress element configured to prestress the switchable control valve in its locked state.

24. The arrangement as recited in claim 23, wherein the hydraulic pump is a lubricant pump configured to supply the internal combustion engine with the hydraulic fluid as a lubricant.

25. The arrangement as recited in claim 23, wherein the switchable control valve, in its locked state, is further configured to switch atmospheric pressure through to the hydraulic control connection.

26. The arrangement as recited in claim 23, further comprising:
a pump housing comprising a separate lubrication connection arranged axially between the hydraulic control connection and the positive-displacement pump rotor, wherein,
the switchable control valve is hydraulically connected with the separate lubrication connection, and
the switchable control valve, in its unlocked state, switches atmospheric pressure P0 through to the separate lubrication connection.

27. The arrangement as recited in claim 23, wherein the coupling arrangement is provided as a form-fit coupling comprising:
a bar holder configured to be non-rotatably connected with the positive-displacement pump rotor or with the coupling element, the bar holder comprising at least one radial bar guide and a bar body which is configured to be displaceable in the at least one radial bar guide;
a guide body configured to be displaceable in an axial direction, the guide body being associated with the bar holder and comprising a guide surface which is inclined in the axial direction, the guide surface being configured to force the bar body in a radial direction into a locked position; and
a trap body configured to be non-rotatably connected with the coupling element or with the positive-displacement pump rotor, the trap body comprising at least one rotary trap depression which is configured to have the bar body engage therewith in a locked position of the bar body.

28. The arrangement as recited in claim 27, further comprising a cylindrical blocking surface arranged on the guide body, the cylindrical blocking surface being configured to block the bar body in the locked position of the bar body.

29. The arrangement as recited in claim 27, further comprising a prestress element configured to mechanically prestress the guide body into the locked position.

30. The arrangement as recited in claim 27, further comprising:
a hydraulic cylinder non-rotatably associated with the bar holder, wherein, the guide body further comprises a hydraulic piston which is arranged to be axially displaceable in the hydraulic cylinder.

31. The arrangement as recited in claim 30, further comprising:
a pump housing which comprises the hydraulic control connection,
wherein, the hydraulic connection is hydraulically connected with the hydraulic cylinder.

* * * * *